United States Patent
Mills et al.

(10) Patent No.: US 10,108,012 B2
(45) Date of Patent: Oct. 23, 2018

(54) VISORS

(71) Applicant: BAE SYSTEMS plc, London (GB)

(72) Inventors: Colin Richard Mills, Rochester (GB); Ian Marshall, Rochester (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 14/910,806

(22) PCT Filed: Aug. 11, 2014

(86) PCT No.: PCT/GB2014/052446
§ 371 (c)(1),
(2) Date: Feb. 8, 2016

(87) PCT Pub. No.: WO2015/022506
PCT Pub. Date: Feb. 19, 2015

(65) Prior Publication Data
US 2016/0187650 A1 Jun. 30, 2016

(30) Foreign Application Priority Data

Aug. 13, 2013 (EP) ..................................... 13275182
Aug. 13, 2013 (GB) .................................. 1314448.0

(51) Int. Cl.
*G02B 27/01* (2006.01)
*A42B 3/04* (2006.01)
(Continued)

(52) U.S. Cl.
CPC .......... *G02B 27/0172* (2013.01); *A42B 3/042* (2013.01); *A42B 3/226* (2013.01);
(Continued)

(58) Field of Classification Search
CPC ................................. G02B 27/14; H04B 7/185
See application file for complete search history.

(56) References Cited

U.S. PATENT DOCUMENTS 4,755,023 A * 7/1988 Evans .................... A42B 3/042
2/424
5,646,784 A 7/1997 Wilson

FOREIGN PATENT DOCUMENTS

DE    1115657 B    10/1961
GB    2149140 A *  6/1985 ......... G02B 27/0103
WO    2015022506 A1  2/2015

OTHER PUBLICATIONS

International Preliminary Report on Patentability received for Patent Application No. PCT/GB2014/052446, dated Feb. 26, 2016. 8 pages.
(Continued)

*Primary Examiner* — Nalini Mummalaneni
*Assistant Examiner* — Robert Michaud
(74) *Attorney, Agent, or Firm* — Finch & Maloney PLLC

(57) ABSTRACT

A glare visor (13) for reducing ambient light intensity perceived by a wearer viewing a head-up display (3) employing display light (7) including a given wavelength(s) of light. The visor includes a visor body comprising optically transparent material which is partially absorbing of light of visible optical wavelengths thereby to reduce the intensity of ambient light transmitted therethrough to the wearer. A transparent optical coating (12) is formed upon a surface of the visor body which is partially transmissive of light of visible optical wavelengths amongst which it is preferentially transmissive of light of a sub-range of wavelengths for including therein the wavelength(s) of display light. This permits a perceived enhancement of contrast between display light (7) relative to ambient light (8).

20 Claims, 14 Drawing Sheets

(51) Int. Cl.
    *A42B 3/22*    (2006.01)
    *G02B 5/22*    (2006.01)
    *G02B 5/20*    (2006.01)
(52) U.S. Cl.
    CPC .............. *A42B 3/228* (2013.01); *G02B 5/205* (2013.01); *G02B 5/22* (2013.01); *G02B 5/223* (2013.01); *G02B 2027/0118* (2013.01)

(56) References Cited

OTHER PUBLICATIONS

International Search Report and Written Opinion received for Patent Application No. PCT/GB2014/052446, dated Nov. 10, 2014. 10 pages.
GB Intellectual Property Office Search Report under Section 17(5) received for GB Patent Application No. 1314448.0 dated Feb. 26, 2014. 3 pages.
Extended European Search Report received for EP Patent Application No. 13275182.7 dated Jan. 13, 2014. 6 pages.

* cited by examiner

Fig. 6B
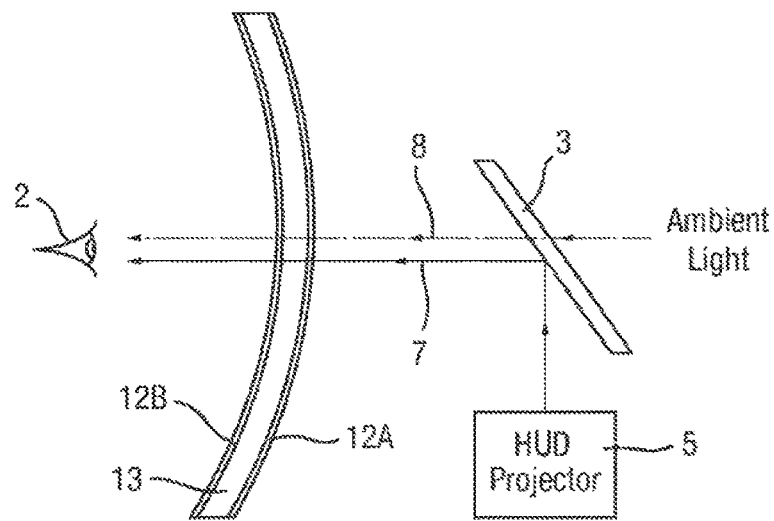
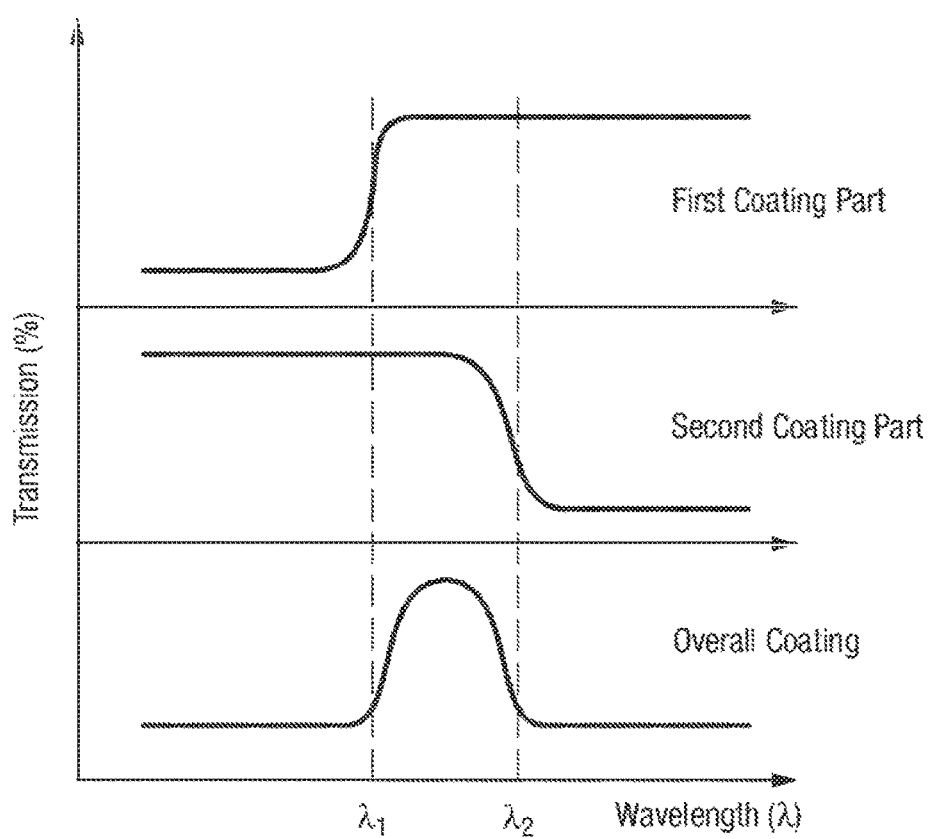

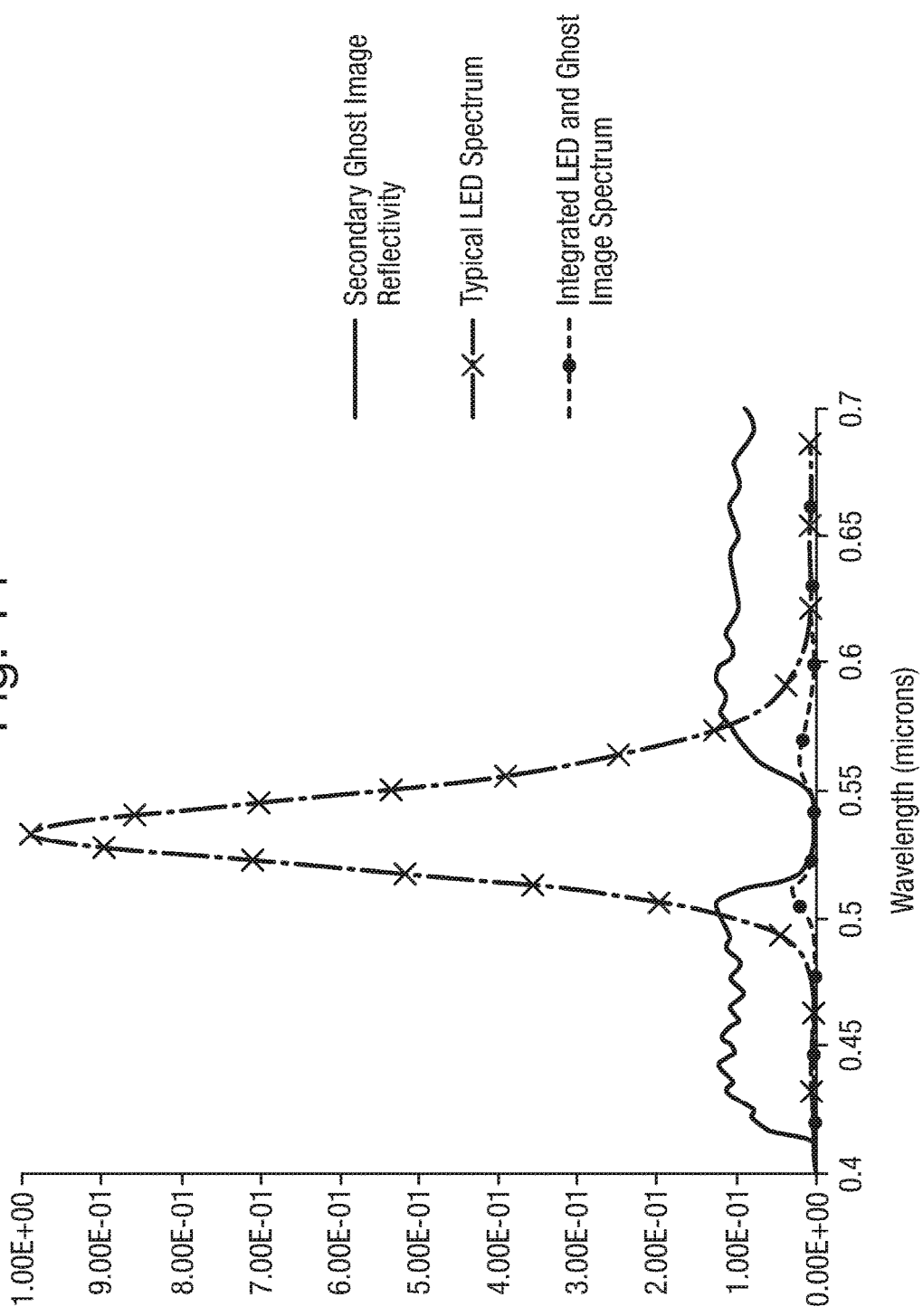

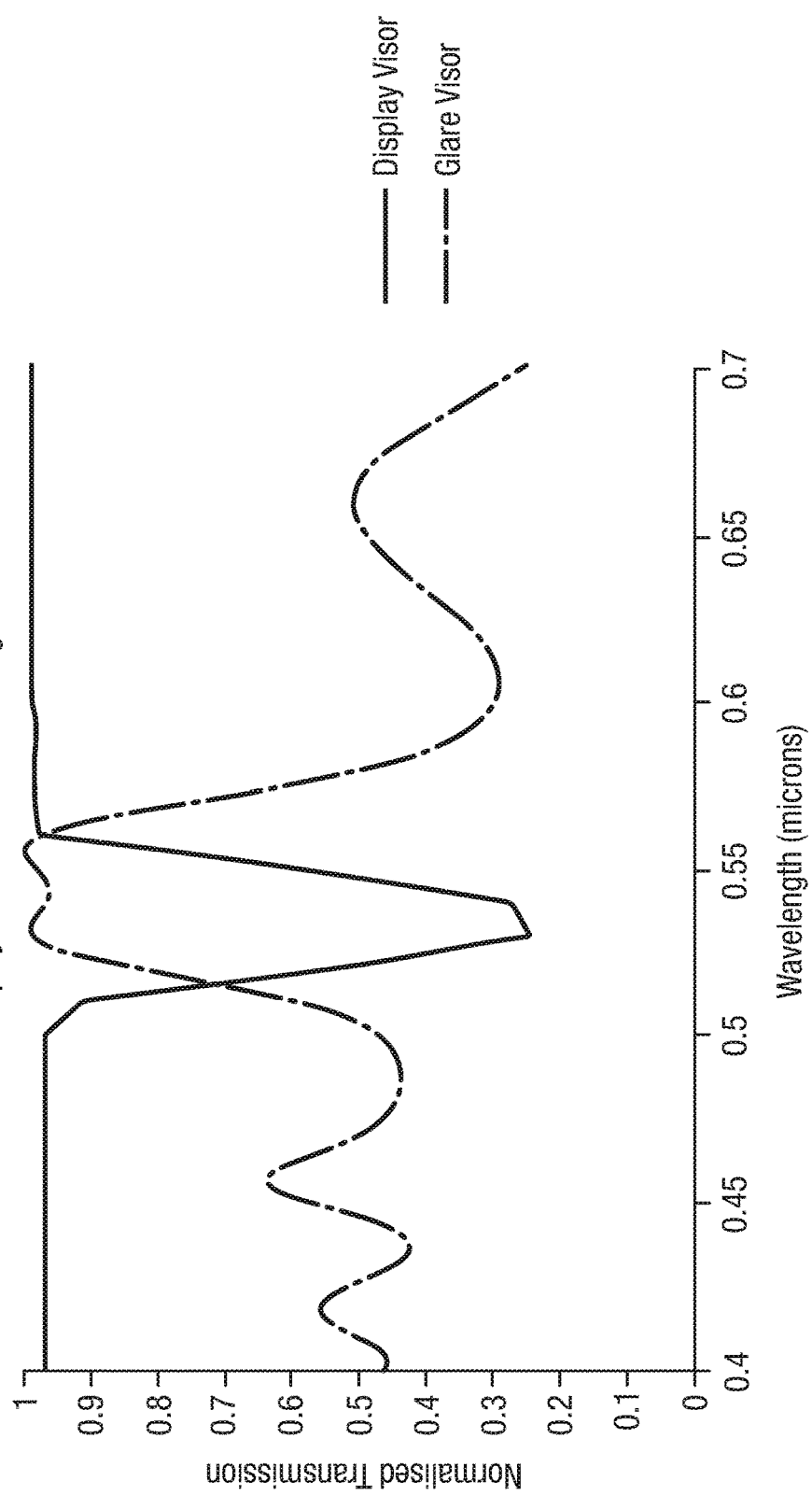

VISORS

FIELD OF THE INVENTION

The invention relates to visors. In particular, though not exclusively, the invention is suitable for use with a Head-Up display (HUD) or the like, such as are commonly used in aircraft and other vehicles, and may be additionally suitable for use with/on a helmet (such as an aviator's helmet) in conjunction with both a HUD and a Helmet-Mounted Display (HMD).

BACKGROUND

Both Helmet Mounted Displays (HMD) and Head-Up Displays (HUD) typically use green light to display imagery. An aircrew helmet may have two visors; a HMD display visor which is a clear visor onto which the HMD projection apparatus projects an image; and a glare visor for providing a reduction in ambient brightness. The latter is deployed when the outside world is too bright for comfortable viewing.

When the two visors are used together the HMD display visor suppresses the brightness of the HUD display light as perceived by the helmet wearer. This occurs because HMDs display visors selectively reflect HMD display light (e.g. green light) to make a projected HMD image bright against the back-drop outside world view. But, if the HMD display visor is used with a HUD apparatus, which would typically generate projected images also in green light, the optical properties of the HMD display visor will attenuate the brightness of the HUD display light as seen by the helmet wearer.

If this conflict occurs when the ambient outside world view is of low to medium brightness, then the problem may be solved by increasing the HUD image brightness. However, this comes at the cost of greater HUD power consumption and reduced equipment lifetime. Furthermore, the brightness of both the HUD image and the HMD image are constrained by many factors such that achieving sufficient such extra brightness in the perceived HUD image, when both HUD and HMD images are to be viewed together, against a bright outside world, is very difficult.

The invention aims to provide an improved glare visor which may assist in enhancing HUD image contrast either when used in combination with a HMD display visor or when used in isolation.

SUMMARY OF THE INVENTION

At its most general, the invention is provision of an optical coating upon a glare visor to suppress the HUD image by less than the suppression of the ambient light of the outside world, so increasing the contrast of the HUD image against the outside world. This invention may comprise adding a colour-selective coating to the glare visor to selectively relatively increase the HUD brightness against the outside world brightness. The invention may apply to the concurrent use of HMD display visors and the coating may be adapted to work with oblique angles of light incidence e.g. between 10 and 50 degrees in air, to be optimised to work with HMDs that obliquely illuminate an HMD display visor.

In a first aspect, the invention provides a glare visor for reducing ambient light intensity presented to (e.g. perceived by) a wearer viewing a display employing display light including a given wavelength(s) of light, the visor including a visor body comprising optically transparent material which is partially absorbing to light of visible optical wavelengths thereby to reduce the intensity of ambient light transmitted therethrough to the wearer, and a transparent optical coating formed upon (e.g. a surface of) the visor body which is partially transmissive to the light of visible optical wavelengths amongst which it is preferentially transmissive to light of a sub-range of wavelengths for including therein the wavelength(s) of display light thereby to permit enhancement of contrast between display light relative to ambient light to be presented therethrough.

In this way, the glare visor may reduce perceived ambient light intensity (e.g. glare) when this is uncomfortably high, without reducing the perceived intensity of display light to the same extent. The selective, preferential transmission of display light relative to ambient light has the effect of a net increase on the relative brightness, or contrast, of the display light as compared to ambient light of the world at large as perceived by the wearer. Consequently, the use of the glare visor need not be detrimental to comfortable display viewing, and indeed, may enhance that viewing experience. The display may be a head-up display (HUD). An example of a head-up display is a display employing a transparent combiner (e.g. a transparent screen) or a vehicular windscreen or aircraft canopy, from which display light is reflected to a viewer. The result is that the viewer is able to view the world at large though the combiner whilst concurrently viewing the reflected display light/image overlaid upon the view of the world by the combiner/windscreen/canopy. In this context, a sufficient degree of contrast between display light and ambient light seen through the combiner/windscreen/canopy is important.

The optical coating may be applied to one or multiple separate surfaces of the body of the visor. The optical coating comprises two separate coating parts, including a first optical coating part formed on a first surface of the visor body and partially transmissive to the light of visible optical wavelengths amongst which it is preferentially transmissive to light of a first sub-range of wavelengths; and, a second optical coating part formed on a second surface of the visor body and partially transmissive to the light of visible optical wavelengths amongst which it is preferentially transmissive to light of a second sub-range of wavelengths which partially spectrally overlaps the first sub-range thereat collectively to define the sub-range of wavelengths of light to which the optical coating is preferentially transmissive. In this way, two separate parts of the coating may have different transmission spectra, individually, but they may act collectively and in synergy to achieve the desired spectral sub-range of preferential optical transmission. The first coating part may reside on the outward-facing ("front") of the glare visor, while the second coating part may reside on the wearer-facing part ("back") of the glare visor. Light passing through the glare visor to the wearer desirably passes through both surfaces/coating parts. The filter characteristics of any/each of the two coating parts may be so-called "edge" or "step" filter characteristics, being generally uniformly higher/lower in transmission at opposite sides of a certain wavelength or may comprise a pass-band spectral characteristic.

Of course it is to be understood that the sub-range of wavelengths is desirably selected to encompass wavelengths of display light associated with a desired display and that wavelengths of display light may differ as between displays.

For example, the transparent optical coating may be preferentially transmissive to light of wavelengths which are greater than 500 nm and less than 600 nm. In this way, display light of optical wavelengths within this sub-range may be preferentially transmitted by the glare visor relative to the transmission of ambient light of other visible wavelengths. For example, the transparent optical coating may be preferentially transmissive to light of wavelengths which are greater than about 525 nm, or more preferably greater than 535 nm, or yet more preferably greater than about 540 nm. For example, the transparent optical coating may be preferentially transmissive to light of wavelengths which are less than about 565 nm, or more preferably less than 555 nm, or yet more preferably less than about 550 nm.

Wavelengths of light typically employed in a display, such as a head-up display or other vehicular display, are often a generally green colour (e.g. about 543 nm). The optical coating may be preferentially transmissive to generally green light.

The transparent optical coating may be at least 20% more transmissive to light within the sub-range of wavelengths than outwith, thereby to be preferentially transmissive thereto. In this way, a significant selective enhancement of contrast of display light may be achieved relative to ambient light of other wavelengths not within the sub-range. Even a small improvement in contrast can lead to significant extensions in the lifetime of a HUD display apparatus (e.g. Cathode Ray Tube). The transparent optical coating may be at least 30% more transmissive, or preferably at least 40% more transmissive, or yet preferably at least 50% more transmissive, or even more preferably at least 60% more transmissive, or more preferably at least 70% more transmissive, or yet more preferably at least 80% more transmissive, or even more preferably at least 90% more transmissive to light (e.g. up to about 100%) within the sub-range of wavelengths than outwith. The optical layer may be substantially purely dielectric, although metallic layers may be employed if desired. The optical layer may be substantially non-absorbing at least for wavelengths within the sub-range of wavelengths, such that the corresponding reflectivity of the optical coating may be given by:

$$\text{Reflectivity} = 1 - \text{Transmissivity}$$

The transparent optical coating preferably comprises a multi-layered partially reflective coating. This may comprise successive alternate layers of two or more different optical coating materials (e.g. Silica, $SiO_2$; Titanium Oxide, $TiO_2$; Tantalum Oxide, $Ta_2O_5$). The optical coating materials may be dielectric materials or may comprise a combination of dielectric materials/layers and metallic materials/layers. The multi-layered coating may comprise at least 10 layers of optical coating material (e.g. between 13 and 18 layers, such as 15 or 16 layers).

The thicknesses of successive layers of the optical coating materials may differ thereby to achieve the desired optical transmission/reflection spectral characteristic in the optical coating. For example, the optical coating may include one or more individual layers having a thickness of less than 10 nm and one or more individual layers having a thickness of more than 200 nm. Other individual layers may have a thickness between 10 nm and 200 nm as desired.

The specific ordering, thickness and material of the individual optical coating layers may be selected as desired to achieve the required spectral reflection/transmission characteristic in the multi-layer optical coating according to standard design techniques in this field. However, it has been found that this range of materials and thicknesses provides particularly suitable results in which the coating provides a sufficiently narrow (but not too narrow) preferential transmission sub-range/band (in wavelengths), and a lesser transmission characteristic for optical wavelengths outside of the sub-range which is sufficiently stable/flat.

The optical coating may be between about 500 nm and about 5000 nm in thickness, for example, between 1000 nm and 2000 nm in thickness. The sub-range (e.g. spectral pass band) of the optical coating may be spectrally substantially centred upon the wavelength of display light (e.g. 543 nm), and may have a full-width at half-maximum (FWHM) of between about 20 nm and about 30 nm, e.g. about 25 nm.

The glare visor may achieve light attenuation through a combination of controlled partial light transmission through the optical coating and light absorption by the body of the visor. The balanced combination of these two mechanisms achieves a desired result.

In conjunction with this property both the transmission and reflectivity of the glare visor desirably enhance other aspects of the system performance, e.g. the contrast of a HUD image when viewed against the outside world.

The filtering characteristic of the visor body may be substantially a neutral density filter. That is to say, the visor body may attenuate light transmitted through it substantially uniformly across optical wavelengths. Alternatively, the filtering characteristic may be such as to produce a coloured visor (e.g. tinted). Coloured pigment may be incorporated in to the body of the visor for this purpose. The glare visor optical coating may be arranged to accommodate the coloured transmission by the body of the visor.

The visor body preferably comprises a plastics material, Acrylic or polycarbonate containing a light-absorbent pigment or dye. The type and/or quantity of pigment or dye may be selected to achieve the desired degree of light attenuation across optical wavelengths. Pigments or dyes may be used such as are readily available to the skilled person for this purpose. Preferably the visor body may be at least 20% (e.g. 23%) transmissive to optical wavelengths, or may be more transmissive, such as between about 30% and 60% transmissive, or between about 40% and 50% transmissive, such as about 48% transmissive. Such higher levels of transmissivity are preferable, or advantageous, in certain embodiments or uses of the visor as will be described in detail below, in achieving a desired level of attenuation of light that may pass through not only the body of the glare visor but also through an HMD display visor before reaching the viewer. Furthermore, the appropriate level of this higher transmissivity (high, but not too high) has a further benefit, in certain applications, of suppressing unwanted "ghost" reflections of HMD display light that has entered the wearer-facing side of the glare visor such as might occur when the visor is used in conjunction with an HMD, as will be discussed in detail below.

The glare visor may include a further transparent optical coating formed upon a surface thereof which is substantially transmissive of said light of visible optical wavelengths amongst which it is preferentially reflective of a further sub-range of wavelengths of light thereby to provide a projection display surface in respect of the further sub-range of light; wherein said sub-range of wavelengths includes or overlaps said further sub-range. This means that the glare visor may also serve as an HMD display screen. The further sub-range preferably encompasses or overlaps with the spectrum of light emitted by a HMD display projector for use with the visor. The optical coating and the further optical coating may be formed on opposite sides/surfaces of the glare visor body.

The glare visor may be made from tinted and/or coloured material which may provide overall ambient light (outside world) transmission that is generally neutral density except within a selected band of wavelengths, e.g. corresponding to, or putting effect to, the colouration or tint.

The body of the glare visor may comprise an active visor material operable/controllable to vary its light transmission characteristics/spectrum according to an external signal or influence. An example is photochromic material that darkens in the presence of UV light. Another example is an electro-optic material which darkens of lightens in response to an electrical signal applied to the material (e.g. a liquid crystal material etc.).

In a second aspect, the invention may provide a helmet comprising a glare visor as described above. The helmet may include a helmet-mounted display (HMD) optical system. Examples include: a HMD projector and a HMD display visor for receiving HMD display light from the HMD projector; a helmet-mounted waveguide display unit such as a slab waveguide display for receiving HMD display light and for guiding the HMD display light to an output location thereof positioned to be viewable to the helmet wearer (e.g. to occlude an eye of the wearer—such as only one eye); a so-called "Pancake" eyepiece or an eyepiece that occludes one eye.

The helmet may comprise a helmet-mounted display (HMD) including a helmet-mounted display projector for projecting HMD display light conveying an image for display, wherein the glare visor includes a further transparent optical coating formed upon a surface thereof which is substantially transmissive of said light of visible optical wavelengths amongst which it is preferentially reflective of said projected HMD display light from the display projector; wherein said sub-range of wavelengths includes a wavelength(s) of said HMD display light.

The helmet may comprise a helmet-mounted display (HMD) including a helmet-mounted display projector for projecting light conveying an image for display, and a display visor for reflecting the projected HMD display light for display, wherein the display visor includes a further transparent optical coating formed upon a surface thereof which is substantially transmissive to the light of visible optical wavelengths amongst which it is preferentially reflective to the projected HMD display light from the display projector. The aforesaid sub-range of wavelengths preferably includes a wavelength(s) of the HMD display light. In this way, the selective reflection of HMD-projected light at the display visor occurs in conjunction with the preferential transmission, through the glare visor, of external display light (e.g. HUD light) seen through the glare visor. Consequently, both external display light and the HMD display light may be viewed concurrently with contrast against ambient light of an external world scene through the glare visor and the HMD visor when used concurrently.

The display visor is preferably positioned, or deployable to a position, between the body of the helmet and the glare visor. The optical coating may be formed upon the surface of the glare visor facing away from the body of the helmet. Consequently, light from the HMD which has transmitted through the display visor may subsequently reflect from the optical coating formed on the glare visor in a direction back towards the wearer of the helmet. This may result in the formation of a perceivable second image, or "ghost" image, of the projected HMD display light which is misaligned with the primary HMD image reflected by the display visor (closer to the wearer). The misalignment is a consequence of the typically offset positioning of a HMD display projector requiring oblique reflection of HMD light to the wearer's eyes via the display visor. Secondary reflection from a surface behind the display visor (i.e. the glare visor) results in a lateral off-set in the secondary image relative to the primary HMD image. However, by placing the optical coating on a surface of the glare visor furthest from the display visor, the secondary reflected HMD light is doubly attenuated by a double-pass through the material of the glare visor thereby reducing the brightness of the secondary image and improving the clarity of the HMD projected display.

The optically transparent material of the body of the glare visor is preferably at least 30% transmissive to the light of visible optical wavelengths, and more preferably is at least 40% transmissive, or more preferably about 50% transmissive to the light of visible optical wavelengths. For example, the body of the glare visor may be about 48% transmissive to the light of visible optical wavelengths with the result that light of a secondary HMD image is attenuated to about (48%)×(48%)=23% of its original value. The % attenuation of the material of the body of the glare visor may be selected to be substantially equal to the square-root of the desired % attenuation to be applied to secondary HMD image light. The reflectivity of the optical coating formed on the glare visor may be selected to work in conjunction with the % attenuation of the material of the body of the glare visor to achieve the desired overall attenuation level by the glare visor. Thus, the glare design of the visor may take account of not only ambient light and external display light, but also HMD projected display light in order to achieve a glare visor useable with a HMD and an external display (e.g. a HUD) which enhances contract of image light relative to ambient external light.

The glare visor may be selectively deployable from a stowed position to a deployed position in which both the glare visor and the display visor are positioned in front of the eyes of a wearer, when the helmet is worn.

In a third aspect, the invention may provide a vehicle or aircraft including a display (e.g. head-up display) in combination with a visor or helmet described above and adapted for use with the display of the vehicle or aircraft.

BRIEF DESCRIPTION OF THE DRAWINGS

FIG. 6B schematically shows a HUD display combiner and a glare visor in which the body of the glare visor bears an optical coating distributed in separate coating parts over two opposite respective visor surfaces;

FIG. 14 graphically shows a typical LED spectrum together with the reflection spectrum (case 8) of FIG. 13, to show how the ghost reflection is minimised over the Led spectrum;

FIG. 15 graphically shows the normalised transmission spectra of the HMD display visor of FIG. 7A, and the glare visor of FIG. 8A as described by Table 2.

DETAILED DESCRIPTION

Figure 1A:
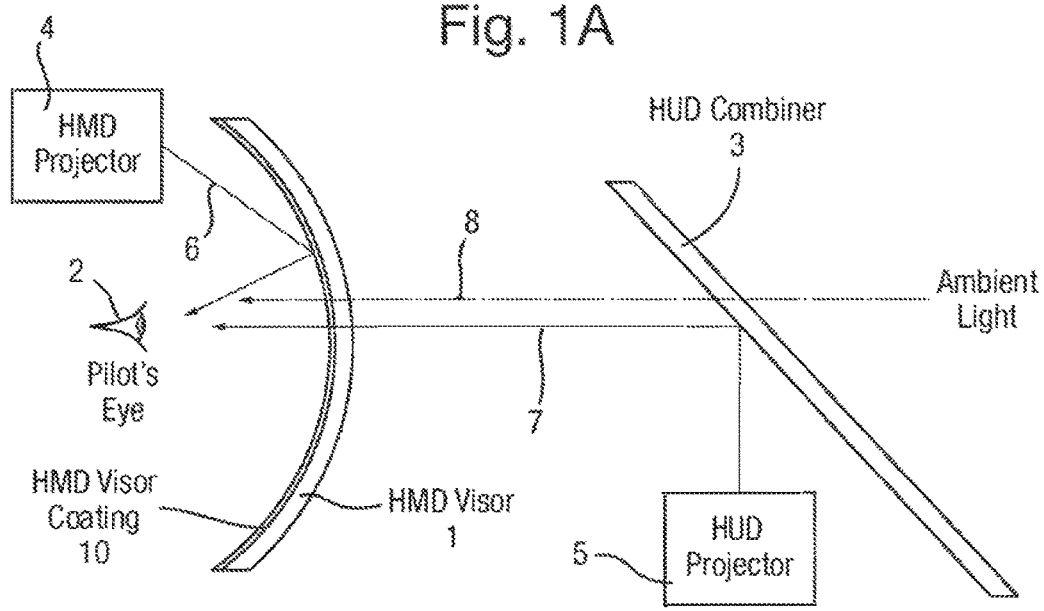
FIG. 1A schematically shows a HMD display visor in combination with a HUD display combiner.

In the drawings like reference symbols refer to like items.

Figure 1B:
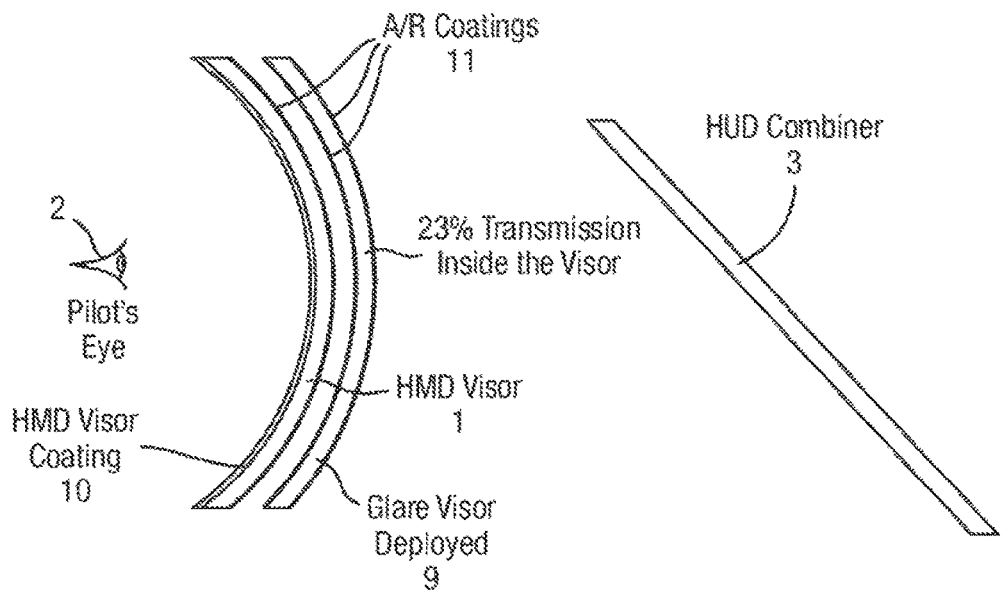
FIG. 1B shows the arrangement of FIG. 1A with a glare visor deployed in addition.

FIG. 1A schematically shows a HMD display visor 1 of an aviator's helmet containing/carrying a helmet-mounted display (HMD) projector 4 (helmet not shown, for clarity) in relation to the wear's eye(s) 2, in combination with a head-up (HUD) display combiner 3 of a HUD display unit 5. FIG. 1B shows the arrangement of FIG. 1A with the addition of a glare visor 9 deployed over the HMD display visor to reduce the perceived glare of ambient light to comfortable levels.

The HMD display visor has a visor coating 10 on its wearer-facing surface comprising an optical coating (e.g. multi-layer) designed to be preferentially reflective at a narrow band of optical wavelengths centred upon the wavelength of the projected light 6 (e.g. 530 nm) produced by the HMD projector for the HMD projected imagery. The outward-facing surface of the HMD display visor 1 and each surface of the glare visor 9 (FIG. 1B) bears an anti-reflective ("A/R") optical coating 11 (e.g. multi-layer) arranged to suppress reflections of ambient light 8 from those surfaces. The HUD display projector is arranged to project HUD display imagery onto the HUD combiner 3 such that it is reflected in the direction of the viewer 2. The combiner is an optically transparent sheet (or may be a windscreen or cockpit canopy) through which a viewer may view a real-world scene (ambient light, 8) overlaid by the reflected HUD imagery 7. The HMD visor is arranged to transmit HUD light 7 and ambient light 8 such that both are seen with HMD imagery further overlaid as well.

The glare visor is formed from a transmissive material, such as a plastics material or the like, which is 23% transmissive to visible optical wavelengths of light substantially uniformly across the visible spectrum. Thus, ambient light intensities as perceived by the wearer 2 are attenuated by deployment of the glare visor as shown in FIG. 1B. However, the attenuation achieved by the glare visor detrimentally reduces the brightness of HUD imagery and can make it difficult to see clearly.

Figure 2A:
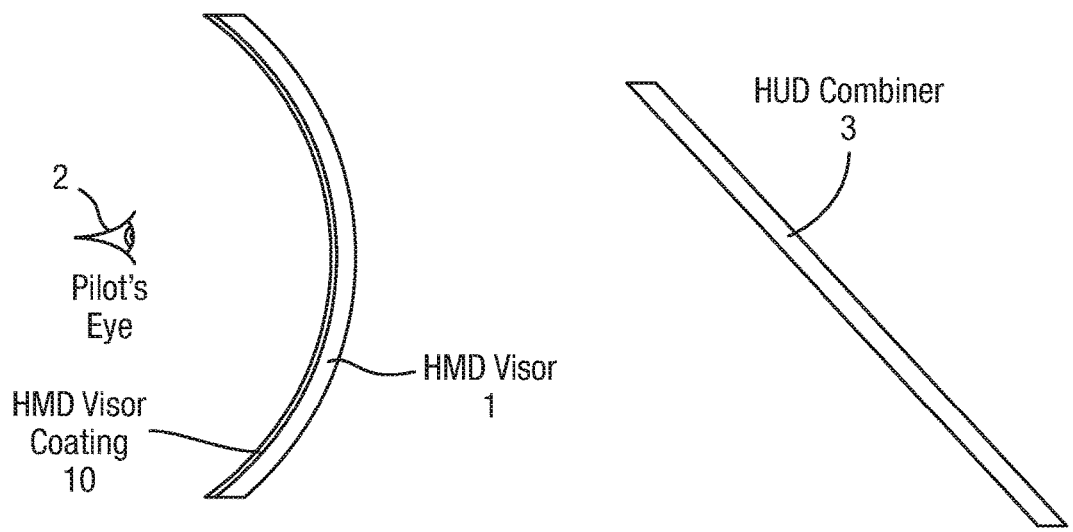
FIG. 2A schematically shows a HMD display visor in combination with a HUD display combiner.
Figure 2B:
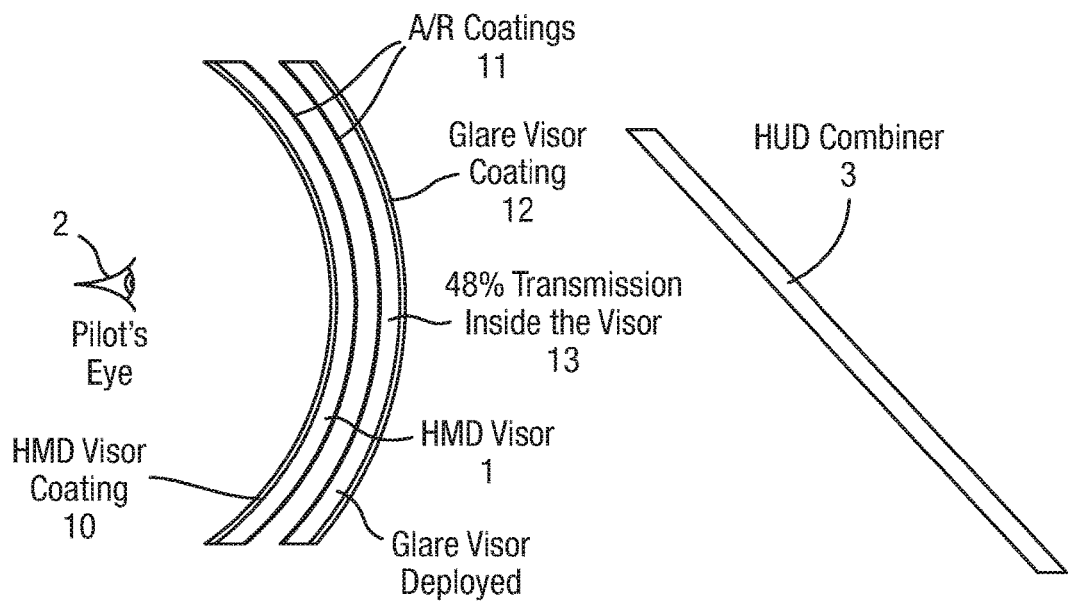
FIG. 2B shows the arrangement of FIG. 2A with a glare visor according to an embodiment of the invention, deployed in addition.

FIG. 2A schematically shows a HMD display visor in combination with a HUD display combiner, as described with reference to FIG. 1A. FIG. 2B shows the arrangement of FIG. 2A with a glare visor according to an embodiment of the invention, in the deployed position. The HMD projector and HUD projector are not shown in FIGS. 2A and 2B for clarity, though it will be appreciated that they will be present as shown in FIG. 1A in use.

Figure 4:
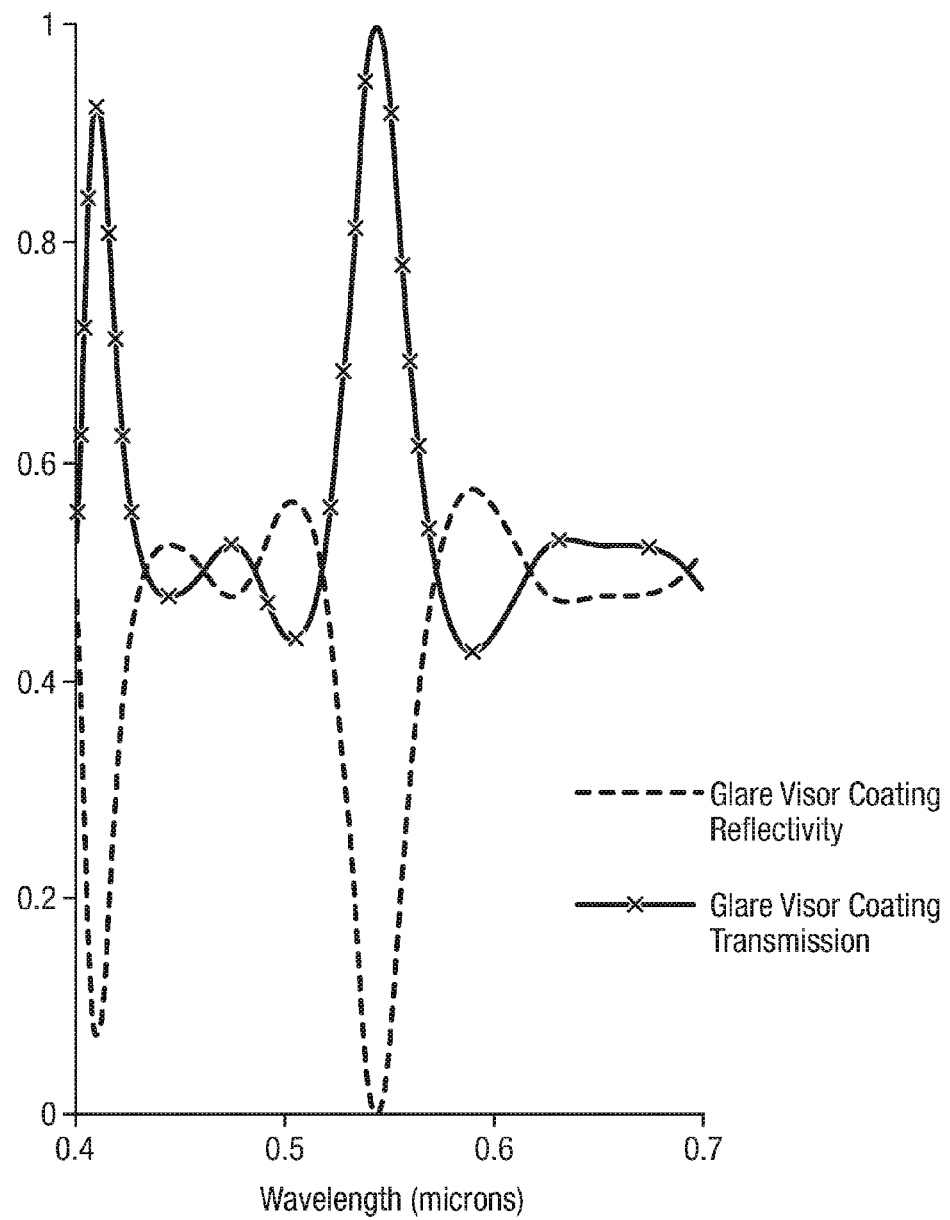
FIG. 4 graphically shows a transmission spectrum of a multi-layer optical coating described in Table 1.

The glare visor is formed from a transmissive material, such as a polycarbonate material or the like (e.g. Acrylic or plastics material), containing light-absorbing dyes or pigments in the required quantity to render it about 48% transmissive to visible optical wavelengths of light substantially uniformly across the visible spectrum. In conjunction with this visor material, the outwardly-facing surface of the glare visor is coated with a multi-layered dielectric optical coating which is designed to be partially transmissive (e.g. about 48% transmissive) to optical wavelengths across the optical spectrum, but to have a spectral pass band (sub-range) of optical wavelengths within this optical spectrum for which it is preferentially transmissive, being more than 50% transmissive and up to about 100% (or nearly so) transmissive at its transmission peak at an optical wavelength corresponding to the wavelength of light used to produce the projected HUD imagery. FIG. 4 graphically illustrates the transmission spectrum of an exemplary optical coating, across the optical spectrum, together with the corresponding reflectivity spectrum (Reflectivity=1−Transmission). The x-axis of this graph shows the wavelength of light in units of microns. The spectral pass-band begins at about 520 nm and ends at about 570 nm, rising to 100% transmission (zero reflectivity) at about 543 nm. The structure of the multi-layered optical coating is shown in Table 1.

It will be noted that where the transmission is high, the reflectivity of the coating is correspondingly low. The spectral pass band of the optical coating is spectrally substantially centred upon the wavelength of light (543 nm) used to project the HUD imagery 7, and has a full-width at half-maximum (FWHM) of between about 20 nm and about 30 nm, e.g. about 25 nm.

TABLE 1

| Layer | Material | Refractive Index | Extinction Coefficient | Optical Thickness (FWOT) | Physical Thickness (nm) |
|---|---|---|---|---|---|
| Medium | Air | 1.00000 | 0.00000 | | |
| 1 | SiO2 | 1.45808 | 0.00000 | 0.17687464 | 72.78 |
| 2 | Ta2O5 | 2.13636 | 0.00000 | 0.56622794 | 159.03 |
| 3 | SiO2 | 1.45808 | 0.00000 | 0.75126293 | 309.15 |
| 4 | Ta2O5 | 2.13636 | 0.00000 | 0.27801264 | 78.08 |
| 5 | SiO2 | 1.45808 | 0.00000 | 0.13003115 | 53.51 |
| 6 | Ta2O5 | 2.13636 | 0.00000 | 0.42120035 | 118.29 |

TABLE 1-continued

| Layer | Material | Refractive Index | Extinction Coefficient | Optical Thickness (FWOT) | Physical Thickness (nm) |
|---|---|---|---|---|---|
| 7 | SiO2 | 1.45808 | 0.00000 | 0.39542241 | 162.72 |
| 8 | Ta2O5 | 2.13636 | 0.00000 | 0.15056801 | 42.29 |
| 9 | SiO2 | 1.45808 | 0.00000 | 0.19600569 | 80.66 |
| 10 | Ta2O5 | 2.13636 | 0.00000 | 0.19399518 | 54.48 |
| 11 | SiO2 | 1.45808 | 0.00000 | 0.52534713 | 216.18 |
| 12 | Ta2O5 | 2.13636 | 0.00000 | 0.23166828 | 65.06 |
| 13 | SiO2 | 1.45808 | 0.00000 | 0.00465790 | 1.92 |
| 14 | Ta2O5 | 2.13636 | 0.00000 | 0.13730366 | 38.56 |
| 15 | SiO2 | 1.45808 | 0.00000 | 0.20650830 | 84.98 |
| Substrate | Acrylic | 1.492 | | | |

The calculated layer thickness values in Table 1 are optimised in respect of light at normal incidence to the multi-layer. The total optical thickness of the multi-layer is 4.3651 (referenced to 600 nm) and the physical thickness is 1537.68 nm. The layer no.15 is formed upon the body of the glare visor.

The optical layer comprises 15 layers alternately of silica (SiO$_2$) and Tantalum Oxide (Ta$_2$O$_5$) arranged in alternating succession upon the substrate of the body of the glare visor (e.g. Acrylic, or polycarbonate etc.) with layer no.1 (silica) being outermost (air-facing) and layer no.15 (silica) being directly formed upon the visor substrate. The substrate is preferably an Acrylic, or polycarbonate or other plastics material. The choice of these materials (refractive indices) and the arrangement and varying thickness of successive layers has been found to produce an optical coating with the desired spectral characteristics as shown in FIG. 4. Thus, ambient light intensities as perceived by the wearer 2 are attenuated by deployment of the glare visor as shown in FIG. 2B. However, the higher transmission (48%) of the glare visor 13 detrimentally reduces the brightness of HUD imagery to a lesser extent than would be the case shown in FIG. 1B, and the spectral pass-band of the optical coating 12 allows the HUD light to pass through the coating substantially un-attenuated. Thus, light attenuation of HUD imagery is generally performed by the transmission characteristic (neutral density) of the material of the glare visor 13. Conversely, ambient light at wavelengths outside the pass-band is attenuated not only by the material of the glare visor (48% transmission), but is also attenuated by partial reflection from the optical coating (e.g. about 50% transmission) with the result that the ambient light intensity at wavelengths outside the pass-band is reduced to about 23%.

In detail, the optical coating 12 is nearly 100% transmissive to green/greenish light (including HUD display light) but about 48% transmissive (52% reflective) to blue/bluish and red/reddish light (these covering the visible spectrum). The body of the glare visor is about 48% transmissive (52% reflective) to light of each of these "colours" red, green and blue. Thus, about 48% of the greenish light passes through the glare visor (100%×48%) whereas about 23% (48%×48%) of the reddish and bluish light passes through. The result is approximately a 2:1 enhancement in relative contrast in green HUD light against reddish/bluish light ambient light.

At the HMD display visor, the display visor coating is preferentially reflective to greenish light (corresponding to the colour of the HMD light), but generally about 100% transmissive to the bluish and reddish light. As a result the 23% of reddish/bluish light passes through the HMD display visor whereas about 42% of the incident greenish light is transmitted leaving about 20% (48%×42%) of the greenish light for viewing by the wearer. The result is approximately a 2:1 enhancement in relative contrast in green HUD light against reddish/bluish light ambient light.

Figure 3:
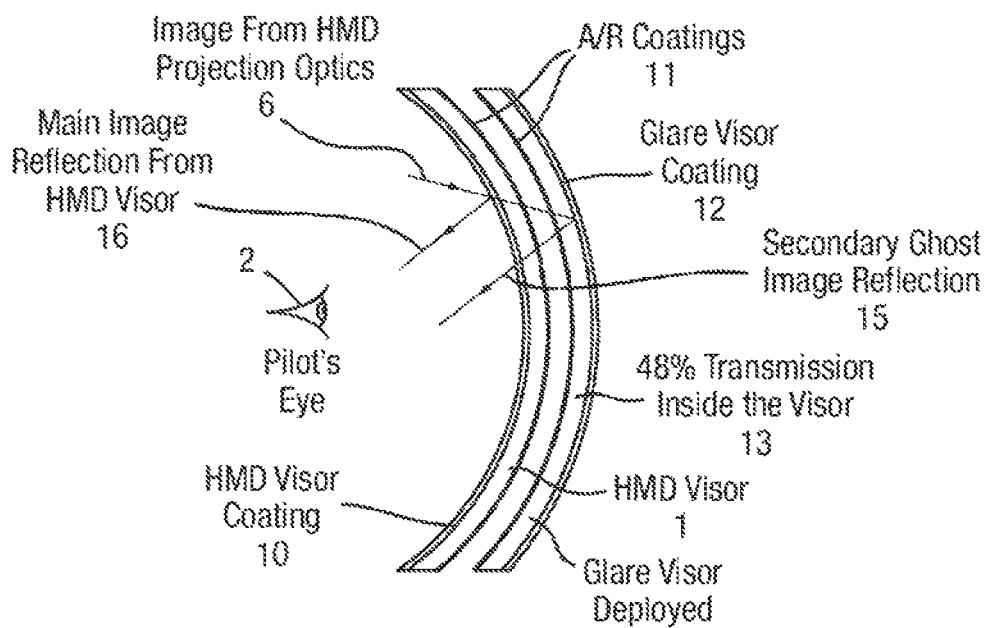
FIG. 3 schematically shows in more detail the HMD display visor in combination with the HMD display visor of FIG. 2B.

Referring to FIG. 3, there is shown schematically the generation of a secondary ghost image 15 of a main HMD projected image 16 due to reflection of obliquely-projected HMD image light 6 that has passed through the HMD display visor 1 and has reached the glare visor 12 (e.g. at an oblique angle of incidence). By placing the optical coating 12 on the outermost surface of the glare visor, HMD image light transmitted through the HMD display visor must pass through the body of the glare visor before reaching the optical coating whereupon it may be preferentially transmitted through the optical coating 12 (being a wavelength of light within the pass-band of the coating). However, any portion 15 of the HMD display light that is reflected by the optical coating 12 will be directed to pass back through the body of the glare visor back towards the wearer 2. This double-pass of unwanted reflected HMD image light means that a the material (e.g. Acrylic, or polycarbonate etc.) of the visor may have a relatively high transmission (e.g. 48%) yet still provide a desired low attenuation (down to 23% transmission) of the secondary ghost image light. This allows the transmissivity of the material (e.g. Acrylic, or polycarbonate etc.) of the visor to remain desirably high for the purposes of passing HUD light 7 therethrough, yet be effective at attenuating unwanted secondary HMD reflections. Thus, the preferential transmission of HMD display light at the optical coating 12 of the glare visor, the optical properties of the material of the glare visor, and the positioning of the optical coating on the glare visor, act in synergy to suppress secondary ghost image reflections of HMD imagery when the glare visor is deployed.

Figure 5:
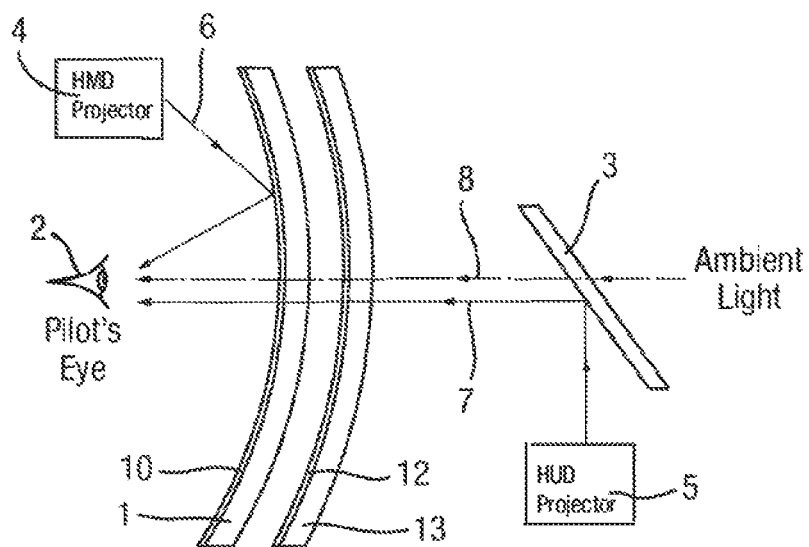
FIG. 5 schematically shows a HMD display visor in combination with a HUD display combiner and a glare visor deployed between them according to an embodiment of the invention.

FIG. 5 schematically shows a variant of the arrangement of FIG. 2B in which the optical coating 12 of the glare visor 13 is formed upon the surface of the glare visor intended to face the wearer in use. When combined with a HMD display visor as shown in FIG. 5, this means that the optical coating 12 of the glare visor 13 is located between the body of the glare visor and the HMD display visor.

Figure 6A:
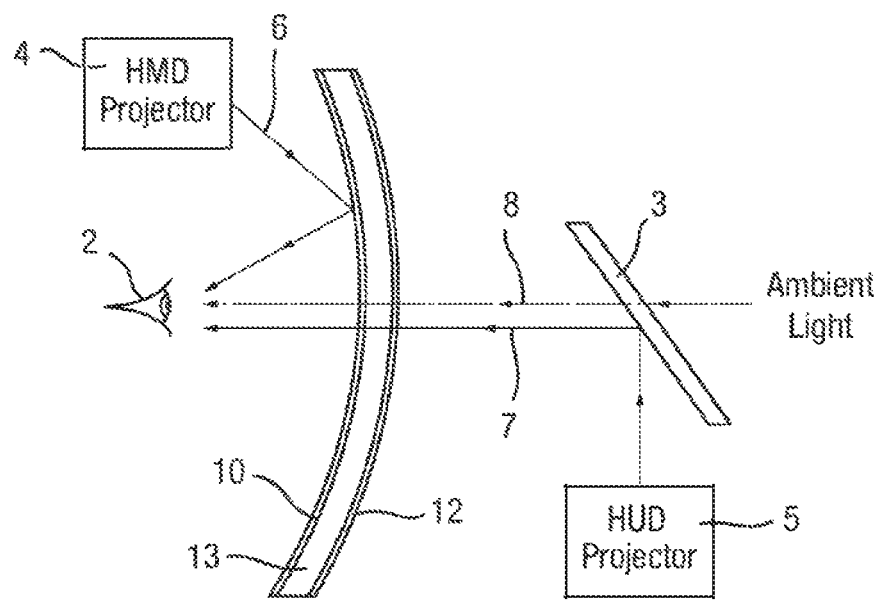
FIG. 6A schematically shows a HMD display apparatus in combination with a HUD display combiner and a glare visor in which the body of the glare visor bears a reflective coating for reflecting HMD display light.

FIG. 6A shows a further variant in which the glare visor alone may serve as both a glare visor and a HMD display visor. In particular, the body 13 of the glare visor bears the optical coating 12 of the glare visor upon the surface of the glare visor intended to face away from the wearer in use, which is adapted for preferentially transmitting HUD display light, whereas upon the surface of the glare visor intended to face towards the wearer, in use, there is formed a HMD display visor coating 10 adapted for preferentially reflecting HMD display light. The HMD display visor coating is a transparent optical coating which is substantially transmissive of light of visible optical wavelengths amongst which it is preferentially reflective of a particular sub-range of wavelengths of light encompassing the HMD display light thereby to provide a projection display surface in respect of the HMD display light. The said sub-range of wavelengths to which the optical coating 12 is preferentially transmissive includes or overlaps the particular sub-range of wavelengths of light encompassing the HMD display light.

In an alternative embodiment, the two optical coatings (12A, 12B) formed on the glare visor, as shown in FIG. 6B, may be two separate parts of one the optical coating—with no HMD display visor coating present on the glare visor. In particular the optical coating comprises two separate coating parts (12A, 12B), including a first optical coating part 12A formed on a first, outwardly-facing surface of the visor body and partially transmissive to light of visible optical wavelengths amongst which it is preferentially transmissive to light of a first sub-range of wavelengths. This first coating part may have, for example, so-called "edge filter" characteristic as shown in FIG. 6B, being preferentially transmissive to optical wavelengths above a first wavelength.

The second optical coating part 12B formed on a second, inwardly-facing surface of the visor body and partially transmissive to said light of visible optical wavelengths amongst which it is preferentially transmissive to light of a second sub-range of wavelengths which partially spectrally overlaps the first sub-range. This second coating part may have, for example, so-called "edge filter" characteristic as shown in FIG. 6B, being preferentially transmissive to optical wavelengths below a second wavelength. The net effect of the two coating parts, upon light passing through the glare visor, is that they collectively to define the overall sub-range of wavelengths of light to which the overall optical coating is preferentially transmissive. That overall sub-range starts at the first wavelength ($\lambda_1$), and ends at the second wavelength ($\lambda_2$). This is shown in the schematic graph in FIG. 6B which shown the spectral filter characteristics of the first and second coating parts separately, and shows the collective effect of the parts working in synergy to provide the preferential transmission sub-range ($\lambda_1$ to $\lambda_2$) of the optical coating overall, The glare visor may be used with or without a separate HMD display visor as required.

Figure 7A:
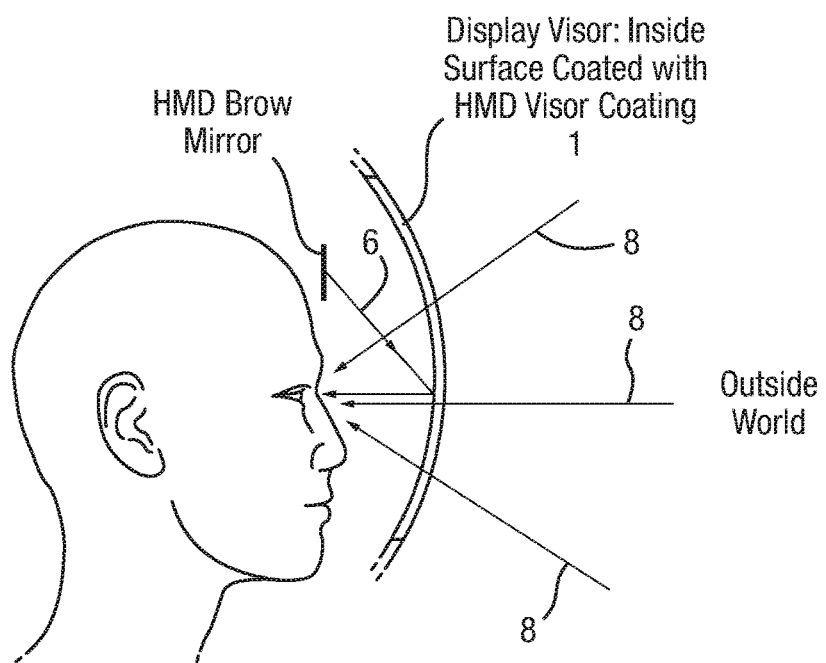
FIG. 7A shows schematically a HMD display visor of a helmet (not shown) carrying a HMD projector (not shown)
Figure 7B:
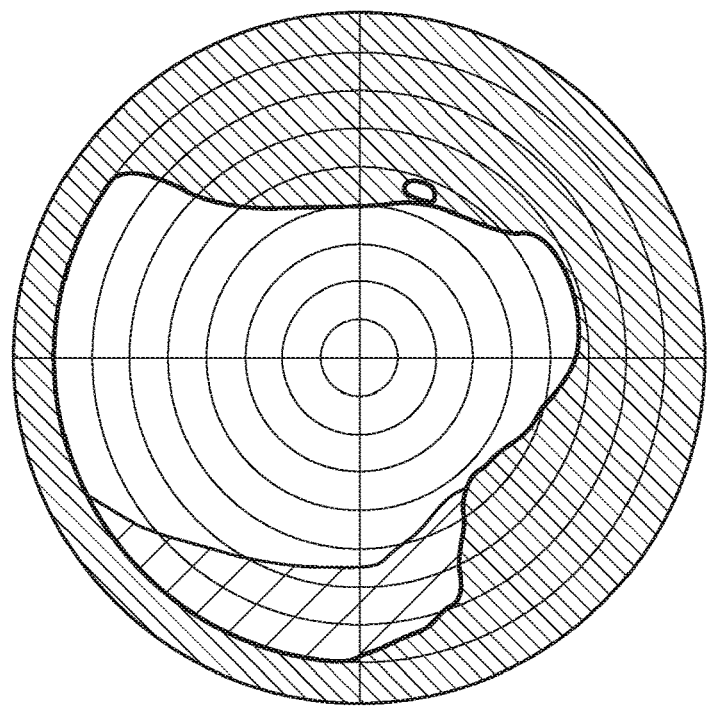
FIG. 7B shows the angular map of the brightness of ambient light transmitted from the outside world as seen through the display visor.

FIG. 7A shows schematically a HMD display visor of a helmet (not shown) carrying a HMD (not shown), and FIG. 7B shows an angular map of the brightness of ambient light transmitted from a "D65" white-light source as seen through the display visor. Transmission through the HMD display screen, of ambient light (outside world) was modelled in terms of a "D65" white-light source to be about 78.01%. Transmission through the HMD display screen, of HUD display light from a "P43" CRT phosphor was about 76.8%. The contrast ratio as between the ambient light and typical HUD display light was found to be D65:P43=1:0.984. All values are photopically weighted.

Figure 8A:
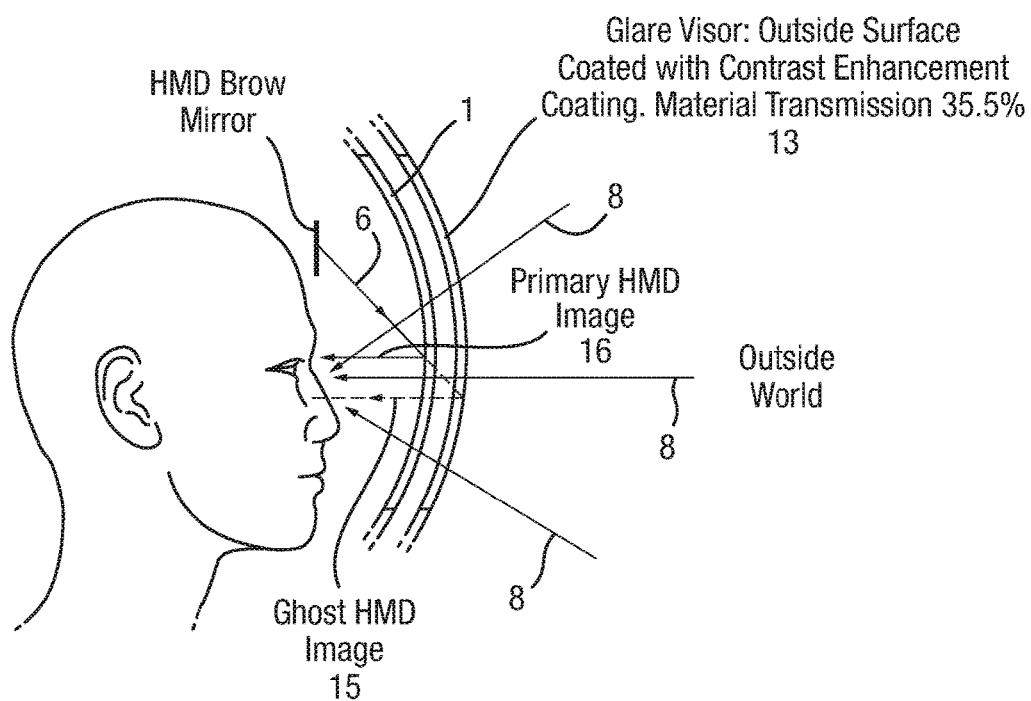
FIG. 8A shows schematically the helmet of FIG. 7A together with a glare visor in the deployed state.
Figure 8B:
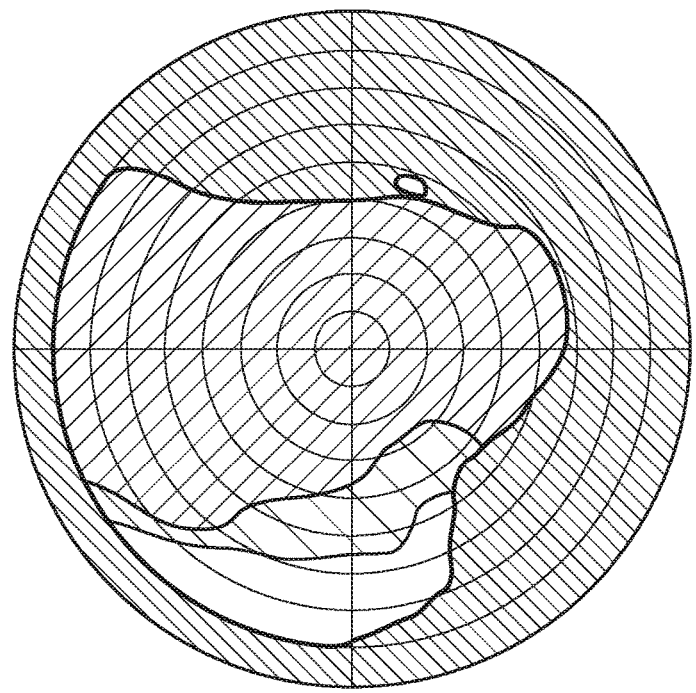
FIG. 8B shows the angular map of the brightness of ambient light transmitted from the outside world as seen through the display visor and glare visor in combination.

FIG. 8A shows schematically the helmet of FIG. 7A together with the glare visor 13 in the deployed state, and FIG. 8B shows an angular map of the brightness of ambient light transmitted from a "D65" white-light source as seen through the display visor and glare visor in combination. Transmission through the HMD display screen and through the glare visor, of ambient light (outside world) modelled in terms of a "D65" white-light source was about 22.65%. Transmission through a HMD display screen and through the glare visor, of HUD display light from a "P43" CRT phosphor was about 35.76%. The contrast ratio as between the ambient light and the HUD display light was found to be D65:P43=1:1.579. This is a 60.3% increase in contrast over display visor only. All values are photopically weighted.

Relative brightness of secondary images due to reflection of HMD display light off the optical coating 12 of the glare visor (shown as dotted line) towards the helmet-wearer, as compared to the main HMD image light (solid line) reflected to the helmet-wearer from the HMD visor coating, was found to be 2.18%. All values are photopically weighted.

The term D65 refers is an industry standard spectrum that defines a white light source, as would be well known to the skilled person. The term P43 refers to a standard cathode-ray tube (CRT) phosphor used on existing HUDs and has a well-known central green spectral emission peak with red and blue side bands. A calculation of how the human eye responds to light converts the units of energy (Watts) into the units of brightness (Lumens). This calculation multiplies the light energy as measured in Watts with a spectral curve, called the photopic curve. The term 'photopically weighted' is an industry standard term to describe this calculation, as would be readily understood by the skilled person.

As a result of contrast enhancement of HUD imagery when a glare visor is deployed, it is no longer necessary to increase the brightness of the HUD display light to achieve suitable contrast levels. Thus, less power consumption is required in the HUD projection apparatus (e.g. a cathode ray tube, CRT) permitting greater operating lifetime of the CRT and the phosphors used within them for generating the projected light.

It is noted that although the embodiments described above relate to HUD displays for generating display imagery, the invention in any aspect or other embodiment may be used, or adapted for use, with other mechanisms for generating display light/imagery may be used, such as dashboard/cockpit console displays where increased contrast is beneficial. This may be in respect of display colours (light wavelengths) other than the green light described above. Also, it will be appreciated that the glare visor may be employed in isolation and without the use/presence of a HMD display visor concurrently.

Figure 9:
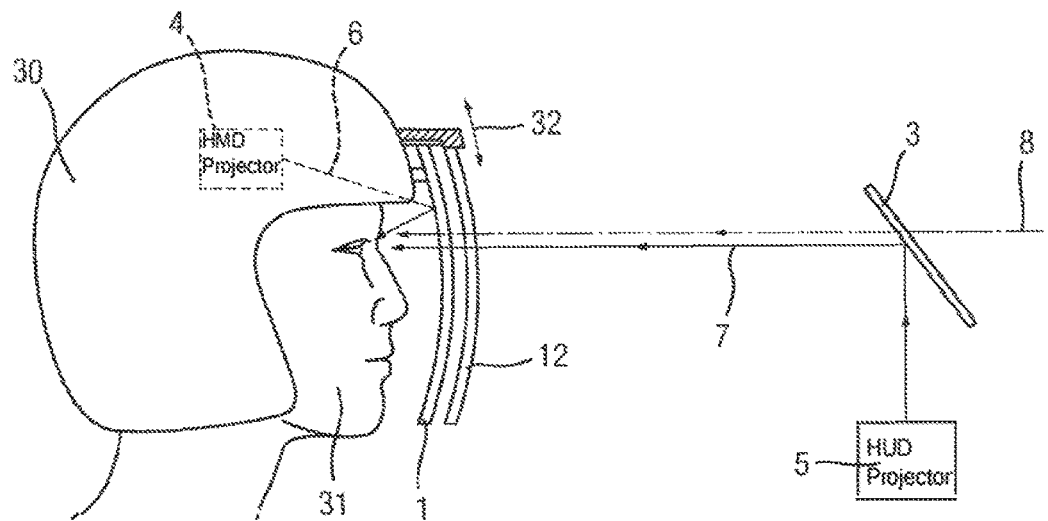
FIG. 9 schematically shows a helmet comprising a HMD including a HMD display visor and a glare visor, in use with a HUD.

FIG. 9 shows a helmet 30 worn by a user 31, in combination with a HUD. The user may be a pilot of an aircraft for example. The helmet bears a HMD comprising a HMD display projector 4 and HMD display visor 1, together with the glare visor 12 shown in the deployed state. The glare visor may be attached to the helmet so as to be slidable in the directions shown by arrow 32, between a stowed state and a deployed state.

Figure 10:
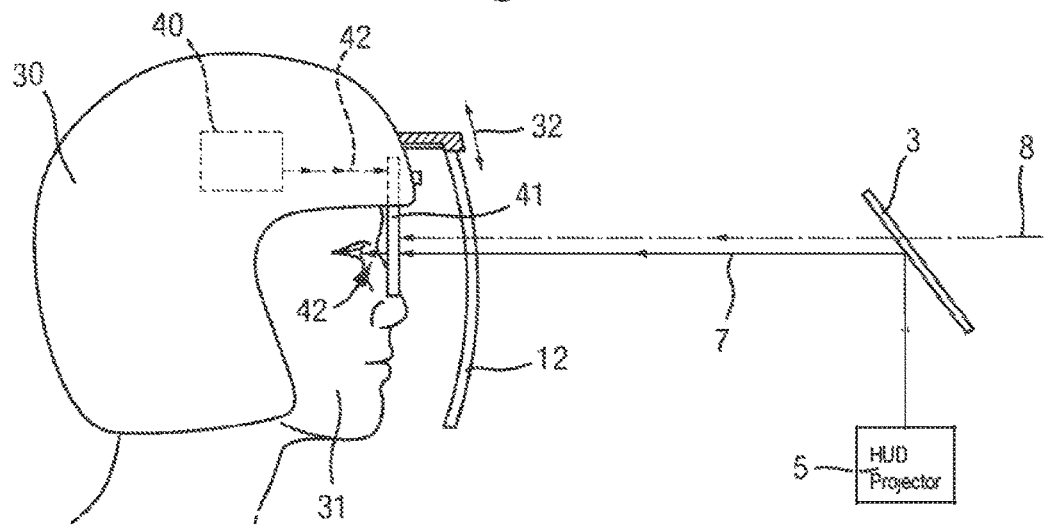
FIG. 10 schematically shows a helmet comprising a HMD including a waveguide display and a glare visor, in use with a HUD.

FIG. 10 shows a variant of the helmet 30 including the glare visor 12, but in which the HMD comprises a HMD display light source 4 and HMD waveguide display element 41, such as a slab waveguide, arranged to receive HMD display light 42 from the HMD display light source into one part/end of the waveguide (e.g. by diffraction) and by a process of total internal reflection therein, guide the HMD display light to another part/end of the waveguide where it is output to the wearer's eye from the waveguide (e.g. by diffraction) as HMD display light 42. In this sense, the HMD display waveguide display element 41 may be positioned to occlude only one eye of the wearer.

Figure 11:
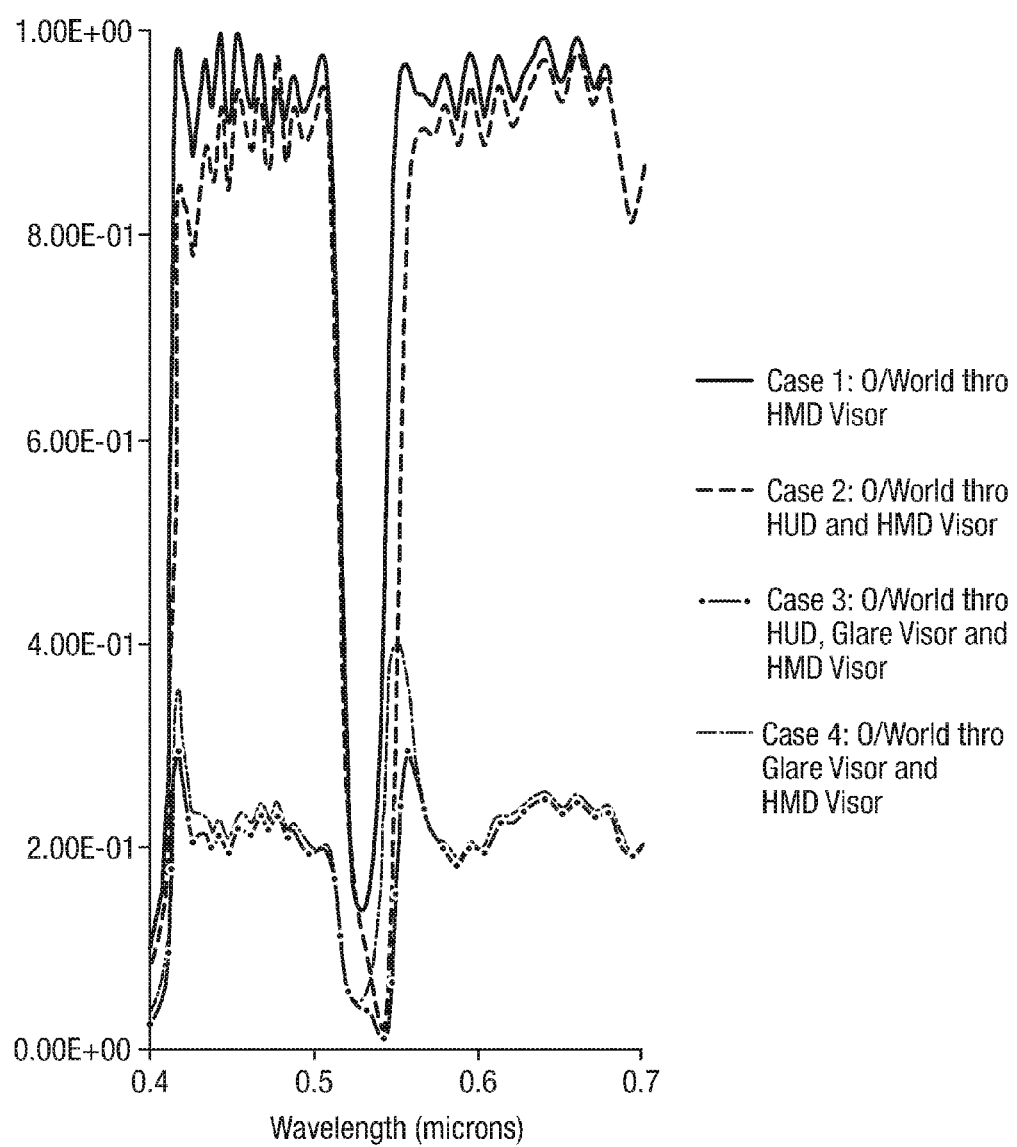
FIG. 11 graphically shows the transmission spectra of a HMD display visor (case 1); the combination of the HMD display visor and a HUD combiner (case 2); the combination of the HUD combiner, glare visor and HMD display visor (case 3); and the combination of the glare visor and the HMD display visor without the HUD combiner (case 4)

FIG. 11 graphically shows the transmission spectrum, over optical wavelengths (0.4 microns to 0.7 microns) of: the HMD display visor 1 alone (case 1); of the combination of the HMD visor and the HUD combiner 3 (case 2); of the HUD combiner 3 and the glare visor 12 and the HMD display visor in combination (case 3); and of the glare visor 12 and the HMD display visor 1 in combination (case 4). Each spectrum is the multiplication of the transmission or reflection spectral curves of the component(s) in question. Ambient light conveying a real-world scene is denoted "o/world". A central band of generally green light is preferentially reflected by the HMD visor (case 1) and this corresponds to preferential reflection of green HMD display light by the HMD visor optical coating 10. The minimal spectral effect of viewing the outside world through HUD combiner, in addition to the HMD display visor, is shown in case 2. Here, the HUD combiner may be arranged to suppress transmission therethrough of optical wavelengths corresponding to the wavelength of the projected HUD imagery to be reflected by the HUD combiner. Thus, a reflective optical coating which preferentially reflects HUD projected light (typically wavelength(s) corresponding to green light) is typically present on the surface of the HUD combiner nearest to the viewer, from which HUD projected image light 7 is reflected to the viewer. This has the effect of reducing the transmission of ambient light of the same wavelength through the HUD combiner from the outside world, as can be seen in case 2.

The effects of viewing the outside world through the HMD display visor and the glare visor 12, both with (case 3) and without (case 4) the HUD combiner present are also shown. It can be seen that the effect of the material of the glare visor in combination with the optical coating 12 is to suppress intensity levels across the spectrum, including the wavelengths associated with the HUD display light, thereby acting in combination with the HMD display filter to provide an effective filter effect without relatively suppressing HUD display light intensity more than other wavelengths of light thereby to enhance the contrast of the HUD display light even though an HMD visor is present.

Figure 12:
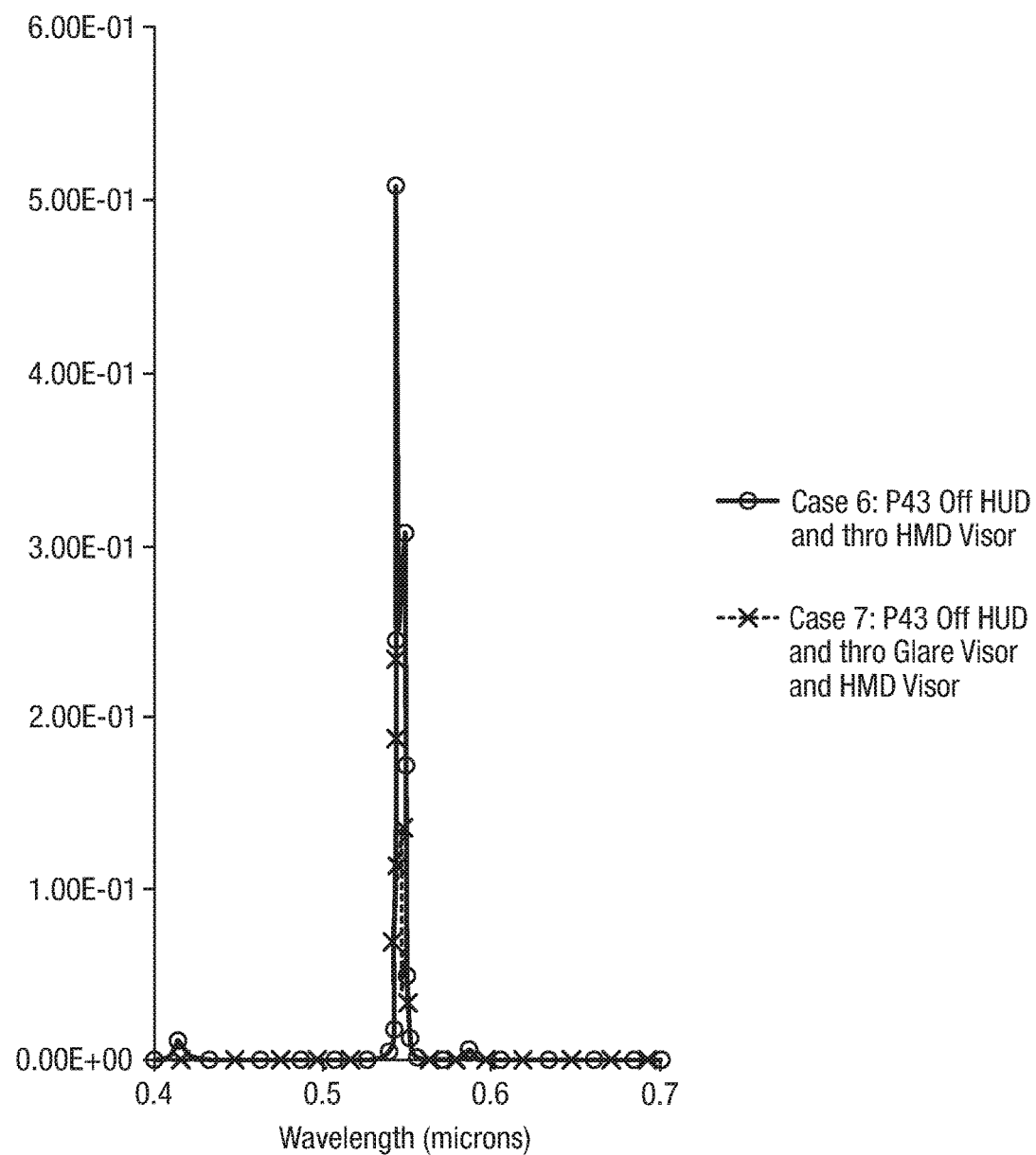
FIG. 12 graphically shows the spectrum of transmitted HUD display light from a HUD display employing a "P43" type phosphor for generating the HUD display light (543 nm wavelength), both before and after deployment of the glare visor.

FIG. 12 graphically shows the spectrum of transmitted HUD display light from a HUD display employing a "P43" type phosphor in a cathode-ray tube for generating the HUD display light (543 nm wavelength), both before and after deployment of the glare visor 13. The ratio between the HUD display brightness before (case 6) and after (case 7) the deployment of the glare visor 13 is about 50%. This compares to 23% if a conventional glare visor is used. Thus, the HUD imagery is typically 2× brighter as compared to the outside world when the glare visor of the present embodiment is deployed compared with the conventional glare visor. The contrast of the HUD display imagery against the outside world is increased.

Figure 13:
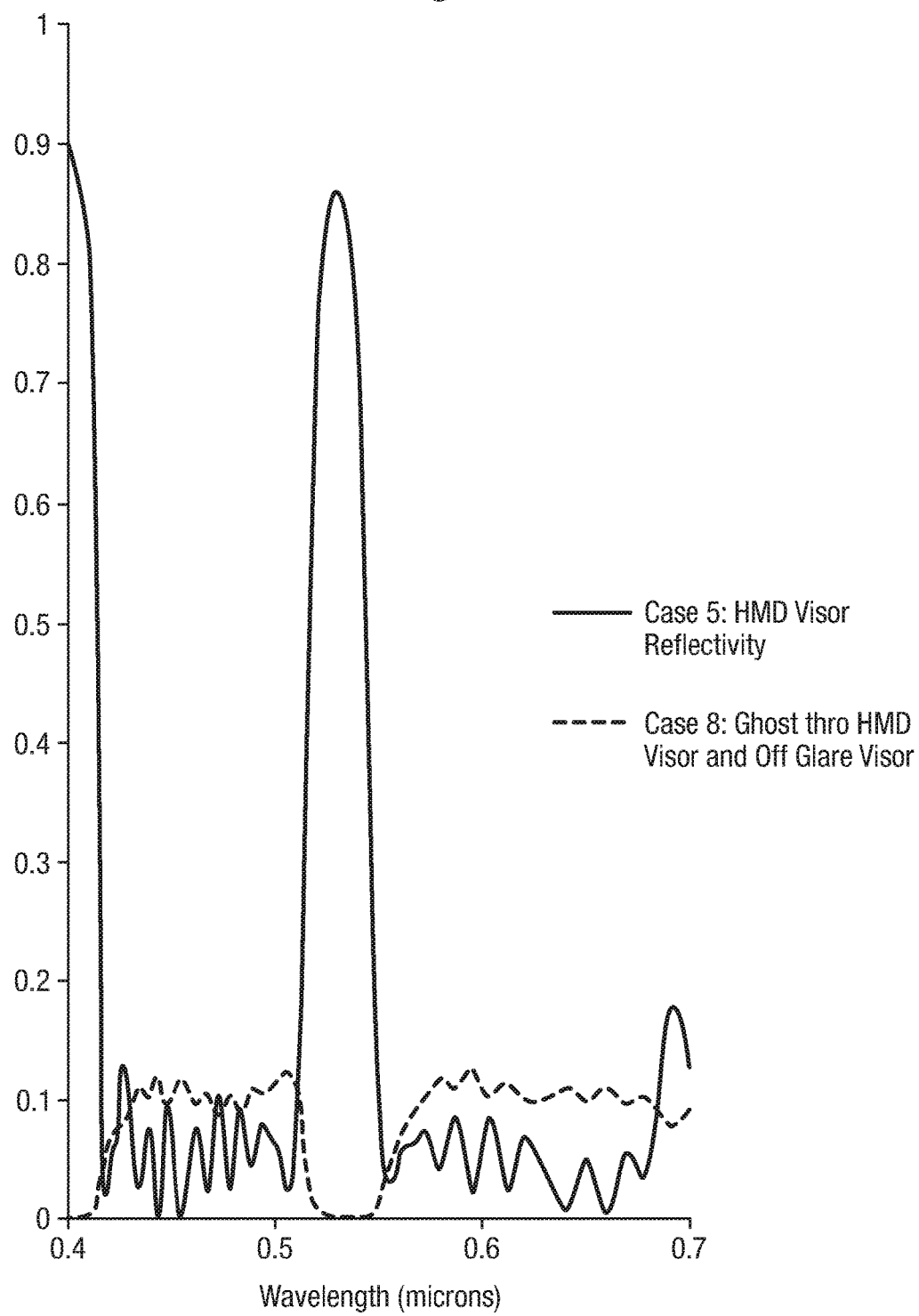
FIG. 13 shows the reflection spectrum of two light paths. Case 5: the reflection spectrum of HMD display light off a HMD visor; Case 8: the reflection spectrum of light that passes from a HMD projector through the HMD visor, and is reflected by the glare visor coating, and then is transmitted a second time through the HMD visor.

FIG. 13 shows the reflection spectrum of two light paths. Case 5: the reflection spectrum of HMD display light off a HMD visor. Case 8: the reflection spectrum of light that passes from a HMD projector through the HMD visor, and is reflected by the glare visor coating, and then is transmitted a second time through the HMD visor. The reflection spectrum of a HMD display visor (case 5) and the spectral intensity of the ghost reflection relative to a HMD display image (case 8) when the glare visor is deployed, are shown on the same graph for comparison. The spectrum of the green HMD display image is matched to the shape of the HMD display visor reflectivity. The secondary ghost image 15 is illuminated by this narrow green spectral band, and correspondingly high transmission in this region, and the effect of the optical coating 12 is to reflect the narrow band green light into the secondary ghost image path. By making the optical coating 12 have a low reflectivity in this narrow green band, the intensity of the ghost image is reduced to acceptable levels (case 8).

FIG. 14 graphically shows a typical LED spectrum used to generate HMD imagery, together with the reflection spectrum (case 8) of FIG. 13. This shows how the ghost reflection is minimised over the Led spectrum. The "integrated" LED and ghost spectrum is the product of the LED spectrum and the secondary ghost image reflectivity across the visible spectral range shown.

The structure of an alternative multi-layered optical coating is shown in Table 2. This optical layer is composed of 16 alternate layers of silica ($SiO_2$) and Titanium Oxide ($TiO_2$) arranged in alternating succession upon the substrate of the body of the glare visor (polycarbonate). The polycarbonate visor material is 1 mm thick and has a 48% transmission to visible optical wavelengths. Optical coating layer no.1 (silica) is outermost (air-facing) and layer no.16 (titanium oxide) being directly formed upon the visor substrate. The choice of these materials (refractive indices) and the arrangement and varying thickness of successive layers within the optical coating has been found to produce an optical coating with the desired spectral characteristics as shown in FIG. 15 in respect of for an angle of incidence of light of 28 degrees. This angle corresponds to the typical angle of incidence of HMD display light upon an HMD display visor 1, as shown schematically in FIG. 3 in an enlargement of FIG. 2B.

TABLE 2

| Layer | Polycarbonate | |
|---|---|---|
| 16 | $TiO_2$ | 98.84762 |
| 15 | $SiO_2$ | 172.7458 |
| 14 | $TiO_2$ | 104.3035 |
| 13 | $SiO_2$ | 126.7382 |
| 12 | TiO2 | 78.46053 |
| 11 | $SiO_2$ | 191.0306 |
| 10 | $TiO_2$ | 39.254 |
| 9 | $SiO_2$ | 77.16242 |
| 8 | $TiO_2$ | 67.27166 |
| 7 | $SiO_2$ | 164.2226 |
| 6 | $TiO_2$ | 125.2394 |
| 5 | $SiO_2$ | 18.06356 |
| 4 | $TiO_2$ | 124.9206 |
| 3 | $SiO_2$ | 18.2702 |
| 2 | $TiO_2$ | 32.72633 |
| 1 | $SiO_2$ | 228.0908 |
| | Air | |

The thicknesses of each layer of the multi-layer are shown in Table 2 in the right column in units of nm. This layer structure is optimal for use with HMD display light incident upon it obliquely at 28 degrees incidence. The embodiments described above are intended to provide illustrative examples of the invention to aid understanding and it will be appreciated that modifications, equivalents and variants to these embodiments, such as would be readily apparent to the skilled person, are encompassed within the scope of the invention, e.g. such as is defined by the claims.

To summarise, the following features and advantages may be provided by example embodiments of the present invention.

By way of context, the present invention may be applied in a HMD having a deployable glare visor within an aircraft cockpit in which an HUD is also provided. The present invention therefore offers the following salient features:

1) There is an interaction between three images: from the outside world; from the HUD; and from the HMD.

2) The present invention offers a dual configuration system with or without an enhanced glare visor in place such that the system may be adapted to a bright outside world by deploying a coated glare visor that provides enhanced performance in the presence of an HMD image.

These features induce a simple problem with the resultant optical system: light from the HMD passes through the inner HMD visor onto the outer enhanced glare visor coating which reflects a ghost image back to the observer. This is inherent to such a configuration and has to be suppressed if the system is to be usable. The glare visor needs to be the outer component to be moveable.

The present invention enables of a ghost image generated by these means to be suppressed sufficiently whilst gaining a substantive advantage in the contrast of the HUD image when viewed against the outside world through the helmet visors.

By setting the enhanced coating transmission level at approximately 50% outside of the pass band; retaining absorbing material within the glare visor; and placing the enhanced coating on the outside of the glare visor, embodiments of the present invention gain the advantage from the light path of the ghost HMD image, after reflection from the enhanced glare visor coating, making a double pass through absorbing material. This is achieved with an approximately 2:1 improvement in contrast of the HUD image against the outside world.

Embodiments of the present invention use the outer glare visor coating to act in two ways: to transmit selectively a green HUD image and to act selectively as an anti-reflection coating so as not to reflect the green HMD image that has leaked through the HMD visor coating.

Thus, embodiments of the present invention are able to suppress HMD ghost images reflecting from the glare visor enhanced coating by placing that coating on the outside of a partially absorbing visor, whilst simultaneously obtaining an increase in the contrast of a HUD image against an outside world scene.

The invention claimed is:

1. A glare visor for reducing ambient light intensity presented to a wearer viewing a head-mounted display (HMD) and an external display, each employing display light including a given wavelength(s) of light, the visor including:
  a glare visor body having an optically transparent material which is partially absorbing to light of visible optical wavelengths, the glare visor body having a wearer-facing surface and an outward-facing surface, the glare visor body being positioned, in use, to receive, at the outward-facing surface, display light from the external display intended to pass through the glare visor for viewing by a wearer, and to receive, at the wearer-facing surface, display light from the HMD that either had been partially transmitted through an HMD display visor that provided a reflected primary display image to the wearer, or is partially reflected off the wearer-facing surface acting as the HMD's display visor to provide the primary display image to the wearer and also partially transmitted through the glare visor body towards the outward-facing surface; and
  a transparent optical coating formed upon the outward-facing surface of the glare visor body, the transparent optical coating being partially transmissive to said light of visible optical wavelengths, and preferentially transmissive to light of a sub-range of the visible optical wavelengths including the given wavelength(s) such that any of the display light from the HMD that is received at the wearer-facing surface and transmitted there through to the outward-facing surface and is reflected by the transparent optical coating to pass back through the glare visor body to become visible to the wearer as ghost images traverses through the glare visor body twice,
  the glare visor body and the transparent optical coating being so arranged thereby both to enhance contrast between display light relative to ambient light and to reduce the intensity of ghost images via double attenuation of the display light from the HMD when traversing through the glare visor body twice.

2. The glare visor according to claim 1 in which the transparent optical coating is preferentially transmissive to light of wavelengths which are greater than 500 nm and less than 600 nm.

3. The glare visor according to claim 1 in which the transparent optical coating is at least 20% more transmissive to light within said sub-range of the visible optical wavelengths than outwith, thereby to be preferentially transmissive thereto.

4. The glare visor according to claim 1 in which a filtering characteristic of the visor body is substantially that of a neutral density filter.

5. The glare visor according to claim 1 in which, wherein the optically transparent material of the visor body comprises a polycarbonate or plastics material containing a light-absorbent pigment or dye.

6. The glare visor according to claim 5 in which the visor body is colour-tinted.

7. The glare visor according to claim 1 in which the transparent optical coating comprises a multi-layered coating.

8. The glare visor according to claim 1 including a further transparent optical coating formed upon a surface thereof which is substantially transmissive of said light of visible optical wavelengths amongst which it is preferentially reflective of a further sub-range of wavelengths of light thereby to provide a projection display surface in respect of the further sub-range of light; wherein said sub-range of wavelengths includes or overlaps said further sub-range.

9. A helmet comprising the glare visor according to claim 1.

10. The helmet according to claim 9 comprising said HMD including a helmet-mounted display projector for projecting HMD display light conveying an image for display, wherein the glare visor includes a further transparent optical coating formed upon a surface thereof which is substantially transmissive of said light of visible optical wavelengths amongst which it is preferentially reflective of said HMD display light from the display projector; wherein said sub-range of wavelengths includes a wavelength(s) of said HMD display light.

11. A vehicle or aircraft including a display in combination with the glare visor according to claim 1 adapted for use with said display of said vehicle or aircraft.

12. A vehicle or aircraft including a display in combination with the helmet according to claim 9 adapted for use with said display of said vehicle or aircraft.

13. The helmet according to claim 9 comprising said HMD including a helmet-mounted display projector for projecting HMD display light conveying an image for display; and, a display visor for reflecting projected HMD display light for display, wherein the display visor includes a further transparent optical coating formed upon a surface thereof which is substantially transmissive of said light of visible optical wavelengths amongst which it is preferentially reflective of said HMD display light from the display projector; wherein said sub-range of wavelengths includes a wavelength(s) of said HMD display light.

14. The helmet according to claim 13 in which the display visor is positioned, or deployable to a position, between the body of the helmet and the glare visor and the optical coating is formed upon the surface of the glare visor facing away from the body of the helmet, wherein the optically transparent material of the body of the glare visor is at least 30% transmissive of said light of visible optical wavelengths.

15. The helmet according to claim 13 in which the glare visor is selectively deployable from a stowed position to a deployed position in which both the glare visor and the display visor are positioned in front of the eyes of the wearer, when in use.

16. The helmet according to claim 13 in which the glare visor is positioned, or deployable to a position, between the body of the helmet and the display visor.

17. The helmet according to claim 13, wherein the helmet-mounted display projector is offset, requiring oblique reflection in the range from 10° to 50° of HMD light to the wearer's eyes via the display visor.

18. The glare visor according to claim 1 in which the optical coating comprises two separate coating parts, including:
- a first optical coating part formed on a first surface of the visor body and partially transmissive to said light of visible optical wavelengths amongst which it is preferentially transmissive to light of a first sub-range of wavelengths; and
- a second optical coating part formed on a second surface of the visor body and partially transmissive to said light of visible optical wavelengths amongst which it is preferentially transmissive to light of a second sub-range of wavelengths which partially spectrally overlaps the first sub-range thereat collectively to define said sub-range of wavelengths of light to which the optical coating is preferentially transmissive.

19. A helmet comprising the glare visor according to claim 18.

20. A vehicle or aircraft including a display in combination with the glare visor according to claim 18 adapted for use with said display of said vehicle or aircraft.

* * * * *